United States Patent

[11] 3,614,462

| [72] | Inventors | Eric G. Lean<br>Ossining;<br>Robert A. Myers, New York; Keith S. Pennington, Somers, all of N.Y. |
|---|---|---|
| [21] | Appl. No. | 789,095 |
| [22] | Filed | Jan. 2, 1969 |
| [45] | Patented | Oct. 19, 1971 |
| [73] | Assignee | International Business Machines Corporation<br>Armonk, N.Y. |

[54] OPTICAL PARAMETRIC AMPLIFICATION AND DETECTION SYSTEM
12 Claims, 1 Drawing Fig.

[52] U.S. Cl. .......................... 307/88.3, 331/94.5, 330/4.5, 350/161, 250/199
[51] Int. Cl. .......................... H03c 5/00, H01s 3/10
[50] Field of Search.......................... 331/94.5; 330/4.5; 307/88.3; 350/161; 250/199

[56] References Cited
UNITED STATES PATENTS

| 3,174,044 | 3/1965 | Tien | 332/7.51 |
| 3,485,559 | 12/1969 | De Maria | 356/138 |

*Primary Examiner*—Ronald L. Wibert
*Assistant Examiner*—R. J. Webster
*Attorneys*—Hanifin and Jancin and John J. Goodwin ABSTRACT: A system for parametric amplification and detection of signals using an acoustic diffraction device in combination with two or more laser cavities. Two types of operation are provided in the disclosure. In the first type of operation, two laser cavities are arranged so that the axes of the cavities intersect at a selected angle. An acoustic Bragg cell is located in the cavities at the intersection point. The two end mirrors of the first cavity are fully reflective. One mirror of the second cavity is fully reflective and the other mirror is partially reflective and partially transmissive.

The first laser cavity is operated above threshold condition and the second cavity is operated below threshold condition. When a signal having a particular frequency $f$ is applied to the Bragg cell, part of the laser light of the first cavity is diffracted into the second cavity and raises the gain of the cavity above the threshold condition. The second cavity then oscillates and the output of the second cavity is detected through the partially transmissive mirror.

In the second type of operation, the structure is the same, however, if desired, both cavities may operate above threshold. When a signal at frequency $f$ is applied to the Bragg cell, light is diffracted from the first cavity into the second cavity and the two cavities become coupled and oscillate only at frequencies which can be supported by the two cavities operating independently. The laser light from the output mirror therefore changes frequency indicating the detection of a signal at frequency $f$.

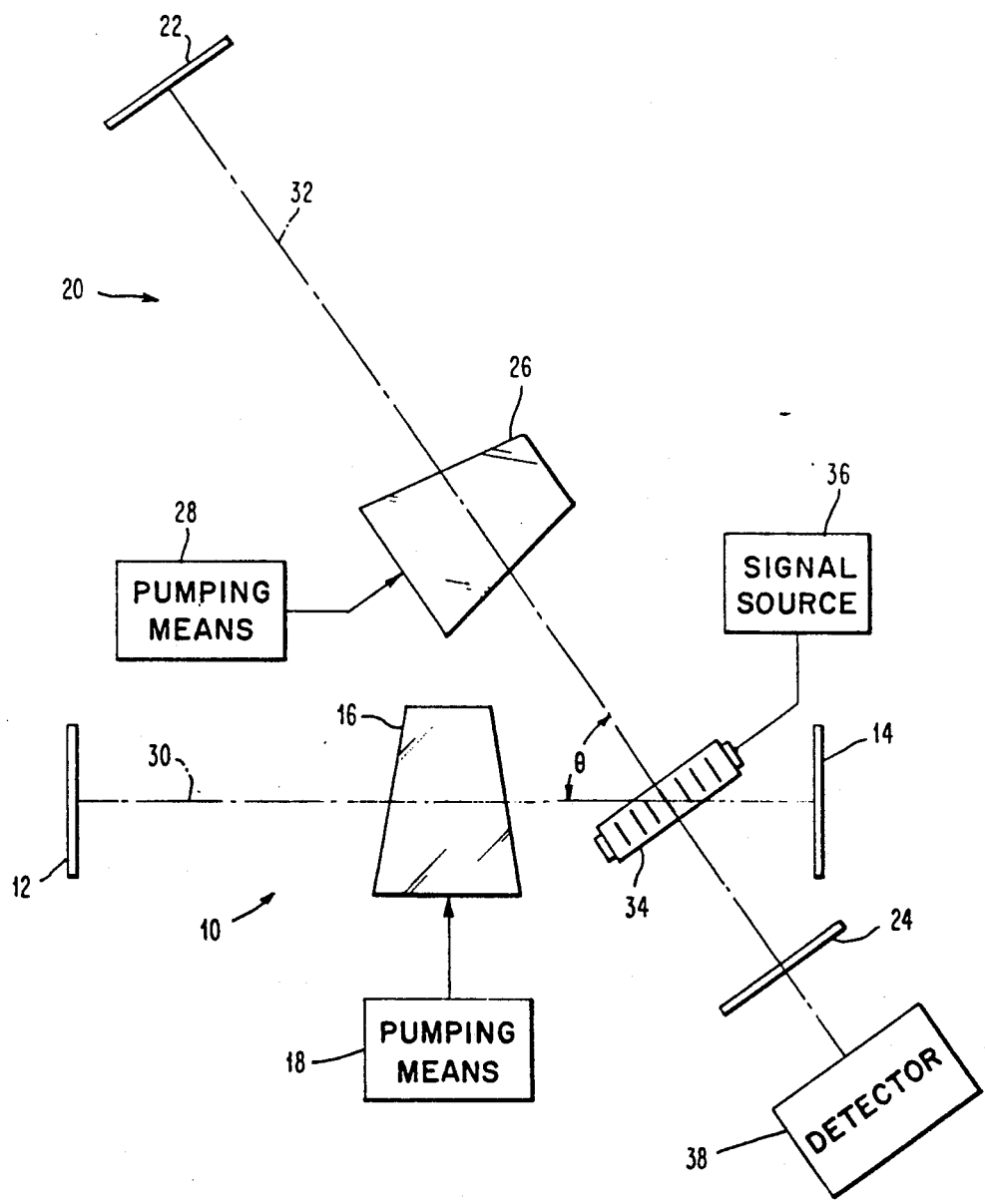

OPTICAL PARAMETRIC AMPLIFICATION AND DETECTION SYSTEM

1. Field of the Invention

The present invention pertains to the field of lasers and more particularly to a parametric amplification and detection system employing two or more laser cavities.

2. Description of the Prior Art

Acoustic diffraction devices have been used to diffract laser beams for purposes of modulation as shown in U.S. Pat. No. 3,297,876, issued Jan. 10, 1967 to A. J. DeMaria and for signal translation as shown by U.S. Pat. No. 3,373,380, issued Mar. 12, 1968 to R. Adler.

The prior art does not teach the combined functions of detection and parametric amplification of a signal by diffraction in two or more laser cavities.

SUMMARY OF THE INVENTION

An object of the present invention is to provide a system for detecting and amplifying an input signal. The system combines the low noise advantage of parametric amplification and the high gain advantage of laser amplification. The system employs a laser cavity which is either caused to oscillate or caused to change frequency by means of light diffracted from another laser cavity.

The foregoing and other objects, features and advantages of the invention will be apparent from the following more particular description of preferred embodiments of the invention, as illustrated in the accompanying drawing.

BRIEF DESCRIPTION OF THE DRAWING

The FIGURE shows in schematic form a detection and amplification system employing two laser cavities and an acoustic Bragg cell.

DESCRIPTION OF THE PREFERRED EMBODIMENTS

Referring to the figure, the two laser cavities are shown as Fabry-Perot type. The first cavity 10 includes first and second reflective means, such as mirrors 12 and 14, which are fully reflective. An active laser medium 16 is located in the cavity between the mirrors and is excited by a suitable pumping means 18. The second cavity 20 includes first and second reflective means, such as mirrors 22 and 24, active medium 26 and pumping means 28. Mirror 22 is fully reflective and mirror 24 is partially reflective and partially transmissive to permit light to be coupled out of cavity 20. The axis 30 of the cavity 10 and the axis 32 of cavity 20 intersect at an angle $\theta$. An acoustic cell 34, such as a Bragg cell, is located in the cavities at the intersection point of the axes and is connected to a signal source 36. Bragg cell 34 may be an isotropic type wherein light is diffracted at an angle equal to the angle at which the light is incident on the cell or an anisotropic type wherein the light emerges normal to the surface of the cell. When an anisotropic Bragg cell is employed, it is located normal to axis 32; if an isotropic cell is used, it is orientated in accordance with angle $\theta$. The relation of the incident and diffracted angle $\theta$ with respect to the frequency of the microwave signal is sin $$\theta = \frac{1}{2} \frac{\lambda_0 f}{v_s}$$

where $\lambda_0$ is the incident light wavelength and $v_s$ is the velocity of the acoustic Bragg cell.

The operation of acoustic light diffraction devices such as Bragg cell 34 is well known. A Bragg cell is an ultrasonic cell including a medium in which ultrasonic waves can be propagated. The cell also includes a transducer which may be electromechanical for generating ultrasonic waves in the medium in response to electrical signals from a source, such as signal source 36. When light is directed into the cell at an angle to the wavefronts of the ultrasonic waves, the light will be diffracted. For a complete discussion of isotropic Bragg diffraction, reference is made to the article in the Journal of the Acoustical Society of America by G. W. Willard, Vol. 21, No. 2, pgs. 101-108, Mar. 1949. For the anisotropic Bragg diffraction, reference is made to the article in Applied Physics Letters by E. G. H. Lean et al. Vol. 10, No. 2, pp at 48, Jan. 1967.

The operation of laser cavities, such as cavities 10 and 20, is also well known. Energy above a given threshold is entered into the active medium in the cavity. Light waves begin to propagate along the cavity axis between the mirrors and are reflected back and forth by the mirrors and pass through the active medium which amplifies the waves until a steady state of oscillation is reached. The cavity may operate at a single frequency of oscillation known as single mode or may support many oscillations at different frequencies referred to as multimode operation.

The subject of laser cavity operation is fully treated in the book "The Laser" by W. V. Smith and P. P. Sorokin, copyright 1966 by McGraw Hill Inc., Library of Congress catalog No. 65-27984 58483.

In the drawing, the mirrors 12 and 14 of cavity 10 are separated by a distance $L_1$, and the cavity will therefore contain oscillations at the axial mode frequencies $v_1 = nc/2L_1$ where $c$ is the speed of light and $n$ is an integer determined by the spacing of the modes in cavity 10. The mirrors 22 and 24 are separated by a distance $L_2$ and cavity 20 therefore can support oscillation frequencies at $v_2 = mc/2L_2$ where $m$ is an integer determined by the spacing of the modes in cavity 20. A selected value of frequency for $v_1$ and $v_2$ can be obtained by spacing the cavity mirrors at the proper values of $L_1$ and $L_2$.

In the first type of operation with an anisotropic Bragg cell, the acoustic frequency $f$ is chosen to satisfy the relation tan $\theta = \lambda_0 f/n_e v_s$ where $v_s$ is the acoustic velocity in the Bragg cell 34, $\lambda_0$ is the optical wavelength of the laser light in a vacuum, and $n_e$ is the index of refraction for the extraordinary waves in Bragg cell 34, the Bragg cell being an optically uniaxial crystal. This relationship provides for maximum diffraction intensity. Thus, the signal at frequency $f$ establishes the condition that much more light is diffracted when applied at angle $\theta$ than at any other angle. Also, an input signal at frequency other than $f$ establish a maximum diffraction intensity condition for an angle other than $\theta$. In the present invention, the input signal frequency $f$ includes frequencies in the microwave range and slightly below, for example, from 10 megahertz to 10 gigahertz.

Cavity 10 is operating above threshold and cavity 20 is below threshold. An input signal at frequency $f$ is applied to the Bragg cell 34 from a source 36 and is converted into sound propagating in the Bragg cell. A portion of the laser light in cavity 10 is diffracted into cavity 20. The frequency of the diffracted light is doppler-shifted and becomes $v_1 \pm f$.

By selecting the length $L_2$ of cavity 20 to satisfy the frequency condition $$v_2 = v_1 + f \quad \frac{mc}{2L_2} = \frac{nc}{2L_1} + f \qquad 1$$

or $$v_2 = v_1 - f \quad \frac{mc}{2L_2} = \frac{nc}{2L_1} - f \qquad 2$$

then cavity 20 will operate above threshold due to the light energy diffracted into it from cavity 10 and the two cavities will operate in the same mode since the frequency condition is satisfied.

The light from cavity 20 is coupled out through mirror 24 and may be applied to a detector 38 such as a photodetector indicating the presence of an input signal at frequency $f$. Due to the fact that the laser cavity has a high Q, it is highly selective and only microwave signals at frequency $f$ will be amplified and detected. Input signals at frequencies other than $f$ will not diffract maximum intensity light for angle $\theta$ and, therefore, the light diffracted is insufficient to cause cavity 20 to oscillate. Cavity 10 has a relatively high gain so that a relatively weak acoustic signal at frequency $f$ can diffract enough light into cavity 20 to cause cavity 20 to oscillate. The output of cavity 20 is strongly amplified by active medium 16, therefore, the system operates as a parametric amplifier and a detector of a selected acoustic frequency signal.

Also, the output intensity of cavity 20 is proportional to the light diffracted from cavity 10 by the acoustic signal which, in turn, is proportional to the amplitude of the microwave signal. Thus, if level of the pumping means is maintained constant, the output intensity of the light from cavity 20 is representative of the amplitude of the input microwave signal.

In the above-described manner of operation, the presence of an input signal of frequency $f$ was indicated by the turning on of cavity 20. All the light emerging from cavity 20 is detected and the intensity of the light provides a representation of the amplitude of the microwave signal.

In a second type of operation, cavity 20 is preferably operating above threshold. The different feature of the second type of operation is that the two cavities are initially operating independently. The input signal applied to the Bragg cell 34 diffracts light from cavity 10 into cavity 20 and causes the cavities to become coupled and effectively operate as one multipath cavity.

In the second type of operation, the frequency of the acoustic waves is $$f = a \frac{c}{2(L_1 - L_2)}$$

where $a$ is an integer. This expression specifies the resonant frequencies of the overall coupled cavities 10 and 20 which corresponds to pairs of resonant frequencies of each cavity. Thus, cavity 10 and cavity 20 are both multimode and when a microwave signal of frequency $f$ is applied to the Bragg cell 34, light is diffracted from cavity 10 into cavity 20 and the cavities only operate with frequencies which were capable of being produced by each cavity operating independently.

The output from cavity 20 through mirror 24 when coupled with cavity 10 produces a given beat frequency which is not present when cavity 20 is operating independently in the noncoupled manner. For input signal frequencies other than $f$, there is insufficient light diffracted from cavity 10 into cavity 20 to cause the cavities to couple and the beat frequency at the output of cavity 20 is not present. A photosensitive output detector 38 now including a selective filter tuned to the beat frequency provides an indication of the presence of a microwave signal of frequency $f$.

As in the first manner of operation, the intensity of the light output of cavity 20 is proportional to the light diffracted from cavity 10 and is therefore a measure of the microwave signal amplitude. Since the detector 38 is designed to respond to a known beat frequency, a more selective amplitude measurement results because the detector is not influenced by ambient light or photons produced by gas discharges.

The coupled laser cavities can be arranged to operate at a single beat frequency provided that the path length difference between $L_1$ and $L_2$ and the angle $\theta$ is adjusted such that $$L_1 - L_2 \leq \frac{C}{2\Delta\nu_D}$$

where $\Delta\nu_D$ is the doppler-broadened line width of the active medium. A minimum value for $L_1-L_2$ is therefore defined, for example, if the line width $\Delta\nu_D$ of the active medium is 1,500 mc. then $L_1-L_2$ must be less than 10 cm.

In the foregoing discussion, expressions were given for detecting an input frequency $f$ in first and second types of operation, both operations employing two cavities and an acoustic cell. In either case, the frequency $f$ may be selected from a wide range since the frequency is determined by selection of cavity length $L_1$ and $L_2$ and the integers $m$ and $n$ which are dependent on the mode spacing in the cavities. The signal source 36 may therefore represent a wide range of microwave signal sources including microwave signals from outer space. Since the microwave signals obtained from outer space are relatively weak, the detection and amplification features of the present invention prove quite useful.

If it is desired that the value of the frequency to be detected be changed, the system of the figure can be adjusted to detect the desired frequency by changing the angle $\theta$ between the cavities or by changing either length $L_1$ or $L_2$.

The figure shows cavities 10 and 20 as Fabry-Perot types. The invention is not limited to this configuration and other type laser cavities, such as confocal cavities with curved end mirrors, may be employed.

In the figure, the detector 38 is shown outside the cavity because this is preferred. However, it is possible in the first type of operation to locate a photosensitive detector inside cavity 20 to detect the presence of the laser beam and in the second type of operation, a frequency sensitive device, such as a square law detector, may be located inside cavity 20 to detect the presence of the beat frequency. In either case, reflective means 24 need not be partially transmissive.

Also, the invention is not limited to the use of two cavities. In some applications, diffraction and coupling between three or more cavities may be desired.

While the invention has been particularly shown and described with reference to preferred embodiments thereof, it will be understood by those skilled in the art that various changes in form and details may be made therein without departing from the spirit and scope of the invention.

What is claimed is:

1. A system for detecting a signal having a given frequency comprising:

a first resonant cavity including first and second reflective means located at opposite ends of a central axis and an active laser medium within said cavity, a second resonant cavity including first and second reflective means located at opposite ends of a central axis and an active laser medium within said cavity, said second cavity positioned with respect to said first cavity such that the central axis of said first cavity and the central axis of said second cavity intersect at a given angle at an intersection point within said cavities, said second cavity being above threshold and producing light oscillations in the form of a laser beam which is reflected within said second cavity by said first and second reflective means thereof, an acoustic diffraction means located in said cavities at said intersection point to be responsive to input signals for producing acoustic waves, said acoustic diffracting means producing an acoustic wave at a particular input signal frequency for diffracting at least a portion of said laser beam from said second cavity into said first cavity for causing said first resonant cavity to oscillate in a predetermined manner.

2. A system according to claim 1 wherein said first resonant cavity is initially below threshold and does not produce light oscillations, and wherein said at least a portion of said laser beam diffracted from said second cavity into said first cavity provides energy in said first cavity for producing light oscillations in said first cavity.

3. A system according to claim 1 wherein said first resonant cavity is initially above threshold and contains light oscillations between said first and second reflective means thereof, and wherein said at least a portion of said laser beam diffracted from said second cavity into said first cavity causes said first and second to oscillate in a coupled mode at at least one frequency capable of being generated by both said first and second cavities independently.

4. A system according to claim 1 further including a detector means associated with said first cavity for producing an output signal in response to said first cavity oscillating in said predetermined manner.

5. A system according to claim 1 wherein one of said first and second reflective means of said first cavity is partially light transmissive and wherein said system further includes a detector means located outside said said cavity proximate to said partially light transmissive reflective means for producing an output signal in response to light transmitted from said first cavity through said transmissive reflective means.

6. A system according to claim 1 wherein said first and second reflective means of said first cavity are separated by an axial distance $L_1$ and said first and second reflective means of said second cavity are separated by an axial distance $L_2$, wherein said first cavity can support light oscillations at axial mode frequencies $\nu_1$ equal to $nc/2L_1$ where $c$ is the speed of light and $n$ is an integer and wherein said second cavity can support light oscillation at axial mode frequencies $\nu_2$ equal to $mc/2L_2$ where $m$ is an integer, and wherein said particular input signal frequency is $f$ and satisfies the relationship $$\frac{mn}{2L_2} = \frac{nc}{2L_1} \pm f$$

7. A system according to claim 1 wherein said first and second reflective means of said first cavity are separated by an axial distance $L_1$ and said first and second reflective means of said second cavity are separated by an axial distance $L_2$, wherein said first cavity can support light oscillations at axial mode frequencies $\nu_1$ equal to $nc/2L_1$ where $c$ is the speed of light and $n$ is an integer and wherein said second cavity can support light oscillation at axial mode frequencies $\nu_2$ equal to $mc/2L_2$ where $m$ is an integer, and wherein said particular input signal frequency is $f$ and satisfies the relationship $$f = a \frac{c}{2(L_1 - L_2)}$$

where $a$ is an integer.

8. A system according to claim 2 further including a photodetector means coupled to said first cavity for producing an output signal in response to light oscillations produced by said first cavity.

9. A system according to claim 2 wherein one of said first and second reflective means of said first cavity is partially light transmissive and wherein said system further includes a photodetector means located outside said first cavity proximate to said partially transmissive reflective means for producing an output signal in response to light oscillations of said first cavity transmitted through said transmissive means.

10. A system according to claim 3 wherein one of said first and second reflective means of said first cavity is partially light transmissive and wherein said system further includes frequency detector means located outside said cavity proximate to said partially transmissive reflective means for producing an output signal in response to said at least one frequency of oscillation in said first cavity.

11. A system according to claim 3 wherein said at least a portion of said laser beam diffracted from said second cavity into said first cavity causes said first and second cavity to oscillate in a coupled mode at plurality of light oscillation frequencies, each one of said plurality of frequencies being capable of being produced by both said first and second cavities oscillating independently of each other, and wherein said plurality of light oscillation frequencies produce at least one beat frequency.

12. A system according to claim 10 further including a frequency detector means associated with said first cavity and tuned to said at least one beat frequency for producing an output signal in response to said at least one beat frequency.